US010090957B2

(12) United States Patent
Balachandran et al.

(10) Patent No.: US 10,090,957 B2
(45) Date of Patent: Oct. 2, 2018

(54) COST EFFECTIVE NETWORK INTERFERENCE CANCELLATION FOR WIRELESS NETWORKS

(71) Applicant: Alcatel-Lucent USA Inc., Murray Hill, NJ (US)

(72) Inventors: Krishna Balachandran, Morganville, NJ (US); Joseph H. Kang, Belle Mead, NJ (US); Kemal M. Karakayali, Highland Park, NJ (US); Kiran M. Rege, Marlboro, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 259 days.

(21) Appl. No.: 14/507,470

(22) Filed: Oct. 6, 2014

(65) Prior Publication Data

US 2016/0099790 A1    Apr. 7, 2016

(51) Int. Cl.
*H04W 72/08* (2009.01)
*H04J 11/00* (2006.01)
*H04L 1/00* (2006.01)
*H04W 24/00* (2009.01)

(52) U.S. Cl.
CPC .............. *H04J 11/005* (2013.01); *H04L 1/00* (2013.01); *H04W 24/00* (2013.01); *H04L 1/0048* (2013.01)

(58) Field of Classification Search
CPC .... H04J 11/005; H04L 1/0003; H04W 72/082

USPC ......................................................... 370/329
See application file for complete search history.

(56) References Cited

U.S. PATENT DOCUMENTS

| 2007/0253388 A1* | 11/2007 | Pietraski ................. H04J 13/00 370/338 |
| 2011/0124289 A1* | 5/2011 | Balachandran ...... H04J 11/0053 455/63.1 |
| 2011/0243279 A1* | 10/2011 | Thian .................... H04L 1/0047 375/340 |
| 2015/0003408 A1* | 1/2015 | Li .......................... H04L 5/0007 370/330 |
| 2015/0082116 A1* | 3/2015 | Kyung ............... H03M 13/1117 714/758 |
| 2016/0249302 A1* | 8/2016 | Uchiyama ............ H04J 11/0056 |

* cited by examiner

*Primary Examiner* — Robert M Morlan
*Assistant Examiner* — Pamit Kaur
(74) *Attorney, Agent, or Firm* — Harness, Dickey & Pierce, P.L.C.

(57) ABSTRACT

Embodiments are described herein to provide improvements to known network interference cancellation techniques. One general approach involves a first network node attempting (801) to decode a received signal which includes signaling from a first wireless device transmission and at least one interfering transmission. If the first network node is unsuccessful in attempting to decode the received signal, it is determined (802) whether it would be cost effective to obtain decoded signaling from a serving network node of a wireless device that corresponds to the at least one interfering transmission. If (803) it is determined to be cost effective, the decoded signaling that corresponds to the at least one interfering transmission is requested.

18 Claims, 10 Drawing Sheets

| 510 | 520 | 530 | 540 |
|---|---|---|---|
| 2 | 0 | 0 | 2 |
| 2 | 1 | 1 | 2 |
| 0 | 1 | 1 | 1 |
| 1 | 0 | 0 | 0 |
| 1 | 1 | 1 | 1 |
| 1 | 1 | 1 | 1 |

Resource Block Index: 1, 2, 3, 4, 5, 6

510: Entries in Decoding State Table of BS i After 1 Round of Decoding

520: Bit-Map in Request Message from BS p

530: Column Corresp. BS p in BS i's Request Table After Receiving Req. Msg. From BS p 540: Column Corresp. BS p in BS i's Request Table After Sending Decoded Data to BS p

FIG. 5

COST EFFECTIVE NETWORK INTERFERENCE CANCELLATION FOR WIRELESS NETWORKS

FIELD OF THE INVENTION

The present invention relates generally to communications and, in particular, to interference cancellation in communication systems.

BACKGROUND

This section introduces aspects that may help facilitate a better understanding of the inventions. Accordingly, the statements of this section are to be read in this light and are not to be understood as admissions about what is prior art or what is not prior art.

Uplink transmissions (also referred to as reverse-link transmissions) in cellular networks comprising multiple base stations often suffer from excessive interference from out-of-cell transmissions. In such networks, wireless devices such as mobile stations (also referred to as mobiles) communicating with different base stations are typically scheduled for transmission independently by the respective base stations. We refer to the base station with which a mobile station is communicating as the latter's primary base station. When a mobile station is reasonably close to base stations other than its primary base station, it is likely to cause significant interference at those base station's receivers. The transmissions of the (interfering) mobile may not be decodable at the receivers of the base stations other than its primary base station, which means that those receivers cannot employ local procedures to cancel the interference caused by the mobile. However, if the primary base station of the mobile station can decode the latter's transmissions, it can send the decoded information bits along with some additional information to the base stations where they are likely to have caused significant interference. Those base stations can then generate estimates of the signals received from the (interfering) mobile station and cancel them out from their respective aggregate received signals, thus improving the latter's decodability.

One drawback of this interference cancellation approach is that it may require substantial backhaul exchanges between base stations. Since most backhaul networks today operate with fairly limited capacity, techniques that are able to reduce these backhaul exchanges would be desirable.

SUMMARY

To address the need to provide improvements to known network interference cancellation techniques, methods and apparatuses are provided. In a first method, a first network node attempts to decode a received signal which includes signaling from a first wireless device transmission and at least one interfering transmission. If the first network node is unsuccessful in attempting to decode the received signal, it is determined whether it would be cost effective to obtain decoded signaling from a serving network node of a wireless device that corresponds to the at least one interfering transmission. If it is determined to be cost effective, the decoded signaling that corresponds to the at least one interfering transmission is requested. An article of manufacture is also provided, the article comprising a non-transitory, processor-readable storage medium storing one or more software programs which when executed by one or more processors performs the steps of this method.

Many embodiments are provided in which the first method is modified. Determining whether it would be cost effective to obtain decoded signaling may be performed in many different ways. In some embodiments, if the size of the decoded signaling exceeds a maximum decoded data threshold, obtaining the decoded signaling is determined to not be cost effective. In some embodiments, if the size of the decoded signaling divided by the number of resource blocks spanned by the decoded signaling exceeds a maximum average data threshold, obtaining the decoded signaling is determined to not be cost effective. In some embodiments, if the modulation scheme associated with the decoded signaling is greater than a maximum modulation rate threshold, obtaining the decoded signaling is determined to not be cost effective. In some embodiments, if the rate of the error control coding associated with the decoded signaling is greater than a maximum rate, obtaining the decoded signaling is determined to not be cost effective. In some embodiments, if the modulation and coding scheme (MCS) associated with the decoded signaling is greater than a maximum MCS rate threshold, obtaining the decoded signaling is determined to not be cost effective.

In some embodiments, if a delta path loss associated with the wireless device is greater than a maximum delta path loss threshold, obtaining the decoded signaling is determined to not be cost effective. Here, the delta path loss associated with the wireless device is a difference in path loss between the first network node and the serving network node of the wireless device. In some embodiments, if a received power difference associated with the wireless device is greater than a maximum received power difference threshold, obtaining the decoded signaling is determined to not be cost effective. Here, the received power difference associated with the wireless device is a difference in received power between the serving network node of the wireless device and the first network node. In some embodiments, it is determined whether obtaining the decoded signaling would be cost effective based at least in part upon the number of overlapping resource blocks between the first wireless device transmission and the decoded signaling.

In a second method, a request for decoded signaling is received from a serving network node of a first wireless device, the decoded signaling being of an interfering wireless device. It is determined whether sending the decoded signaling to the serving network node would be cost effective. If it is determined to be cost effective, the decoded signaling is sent to the serving network node. An article of manufacture is also provided, the article comprising a non-transitory, processor-readable storage medium storing one or more software programs which when executed by one or more processors performs the steps of this method.

Many embodiments are provided in which the second method is modified. Determining whether it would be cost effective to send the decoded signaling may be performed in many different ways. In some embodiments, if the size of the decoded signaling exceeds a maximum decoded data threshold, sending the decoded signaling is determined to not be cost effective. In some embodiments, if the size of the decoded signaling divided by the number of resource blocks spanned by the decoded signaling exceeds a maximum average data threshold, sending the decoded signaling is determined to not be cost effective. In some embodiments, if the modulation scheme associated with the decoded signaling is greater than a maximum modulation rate threshold, sending the decoded signaling is determined to not be cost effective. In some embodiments, if the rate of the error control coding associated with the decoded signaling is greater than a maximum rate, sending the decoded signaling is determined to not be cost effective. In some embodiments, if the modulation and coding scheme (MCS) associated with the decoded signaling is greater than a maximum MCS rate threshold, sending the decoded signaling is determined to not be cost effective.

In some embodiments, if a delta path loss associated with the interfering wireless device is greater than a maximum delta path loss threshold, sending the decoded signaling is determined to not be cost effective. Here, the delta path loss associated with the interfering wireless device is a difference in path loss between the serving network node of the first wireless device and a serving network node of the interfering wireless device. In some embodiments, if a received power difference associated with the interfering wireless device is greater than a maximum received power difference threshold, sending the decoded signaling is determined to not be cost effective. Here, the received power difference associated with the interfering wireless device is a difference in received power between the serving network node of the first wireless device and a serving network node of the interfering wireless device. In some embodiments, it is determined whether sending the decoded signaling would be cost effective based at least in part upon the number of overlapping resource blocks between a transmission of the first wireless device and the decoded signaling.

Network node apparatuses are also provided. A first network node includes a network interface for communication with other network devices, a wireless transceiver, and processing unit communicatively coupled to the network interface and the wireless transceiver. The processing unit is configured to attempt to decode a received signal, the received signal comprising signaling received via the wireless transceiver from a first wireless device transmission and at least one interfering transmission. The processing unit is further configured to determine, if unsuccessful in attempting to decode the received signal, whether it would be cost effective to obtain decoded signaling from a serving network node of a wireless device that corresponds to the at least one interfering transmission. The processing unit is further configured to request, if determined to be cost effective, the decoded signaling that corresponds to the at least one interfering transmission.

Many embodiments are provided in which this first network node is modified. The processing unit may be configured to determine whether it would be cost effective to obtain decoded signaling in many different ways. Various examples of how the processing unit might be configured in this manner are described above with respect to embodiments of the first method.

A second network node includes a network interface for communication with other network devices, a wireless transceiver, and processing unit communicatively coupled to the network interface and the wireless transceiver. The processing unit is configured to receive via the network interface a request for decoded signaling from a serving network node of a first wireless device, the decoded signaling being of an interfering wireless device. The processing unit is further configured to determine whether sending the decoded signaling to the serving network node would be cost effective and, if cost effective, to send the decoded signaling to the serving network node via the network interface.

Many embodiments are provided in which this second network node is modified. The processing unit may be configured to determine whether it would be cost effective to send the decoded signaling in many different ways. Various examples of how the processing unit might be configured in this manner are described above with respect to embodiments of the second method.

BRIEF DESCRIPTION OF THE DRAWINGS

FIG. 5 illustrates the handling of request messages in accordance with various embodiments of the present invention.

Figure 1:
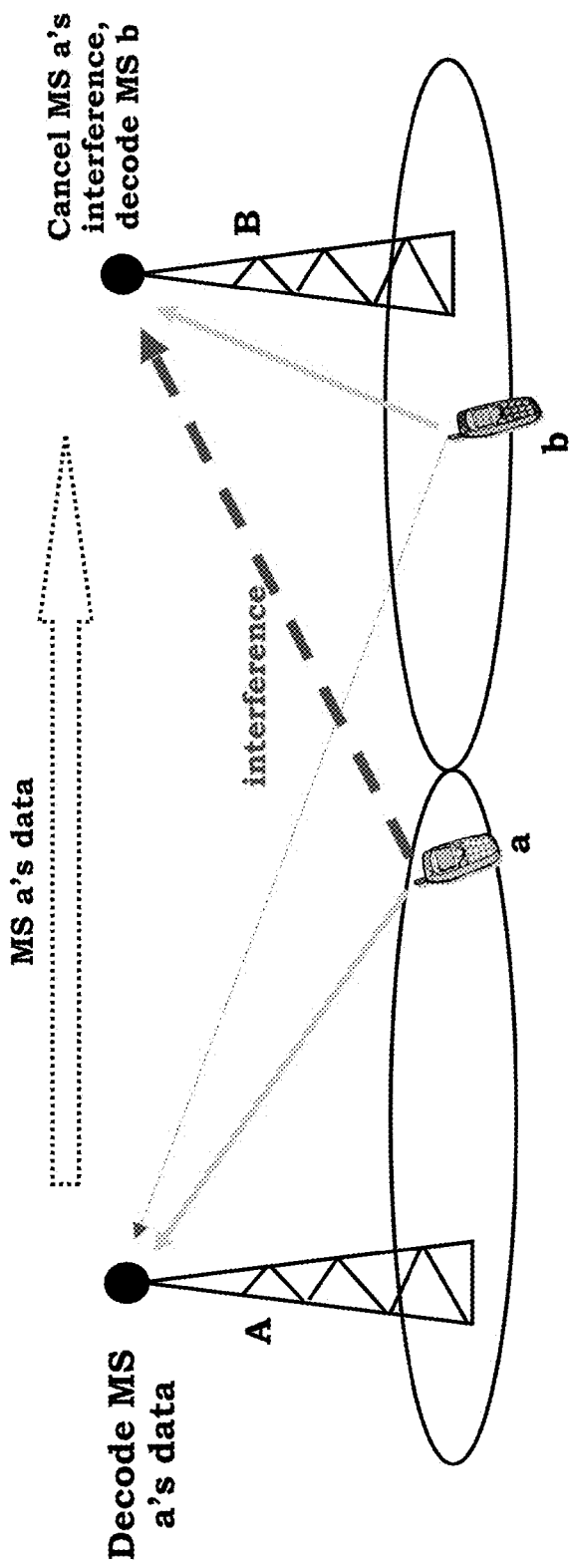
FIG. 1 illustrates an example of multi-cell interference cancellation for a simplified two-cell network.

Specific embodiments of the present invention are disclosed below with reference to FIGS. 1-10. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

An allied set of issues addressed by embodiments of the present invention concerns the efficiency of the overall scheme for interference cancellation. Sending decoded information bits from one base station to another where they can potentially be used for interference cancellation increases the load carried by backhaul links. Since the capacity of backhaul links is an important consideration in the overall system design, it is imperative to ensure that the load on these links is kept to a minimum by sending the decoded information bits only to those base stations where they are likely to be useful for interference cancellation.

To that end, embodiments are presented herein that incorporate methods and protocols to determine when information bits decoded at a base station should be sent to another base station for interference cancellation. These methods and protocols may be implemented in a distributed manner, enabling a truly distributed scheme for network interference cancellation.

To provide a greater degree of detail in making and using various aspects of the present invention, a description of our approach to network interference cancellation and a description of certain, quite specific, embodiments follow for the sake of example. FIGS. 1-7 are referenced in an attempt to illustrate some examples of specific embodiments of the present invention.

The basic idea underlying many of the embodiments described herein is as follows. The receiver associated with each sector independently (in a totally distributed manner) attempts to decode the signals transmitted by mobile stations in that sector. In this, it uses only the signal samples collected by antennas associated with it. At the same time, it attempts to estimate channel coefficients associated with mobile stations in its own sector as well as those that are in its neighboring sectors. If the receiver is successful in decoding the signals transmitted by mobiles in its own sector, it passes them on to the higher layers and also holds on to them for some time in the expectation that they can be sent to receivers in its neighborhood to help them with interference cancellation. If the receiver is unsuccessful in decoding the signals transmitted by mobile stations in its own sector, it sends request messages to receivers in its neighborhood, asking them for their respective decoded signals. Such a request is sent to a receiver only if the channel estimate for the mobile station in the associated sector is of a good quality. (Since interference cancellation using a poor quality channel estimate does not lead to improved decodability, there is little point in requesting decoded data associated with mobile station whose channel estimate has a low signal-to-noise ratio.) This avoids movement of decoded data that is not useful for interference cancellation. In another embodiment of this invention, the determination of whether to pass decoded data from one sector to another is additionally based on the amount of decoded data to pass. In this way, one may achieve a desirable tradeoff between the benefit achieved by network interference cancellation and the backhaul capacity required to support it.

After receiving decoded data from one or more of neighboring base station receivers, the requesting receiver reconstructs the corresponding interfering signals using the associated channel estimates, and subtracts these reconstructed signals from the original signal samples to improve their Signal-to-Interference+Noise Ratio (SINR). The resulting samples are processed via standard decoding procedures to extract the signals transmitted by mobile stations in the associated sector. If this round of decoding is successful, the receiver, as in the previous round, passes on the decoded data to the higher protocol layers and saves a copy for interference cancellation at other receivers. Otherwise, as at the end of the previous round, it sends request messages to neighboring receivers. This procedure is repeated until either the signals are successfully decoded or the upper limit on decoding rounds is reached.

FIG. 1 illustrates the concept of multi-cell interference cancellation for a two-cell network comprised of base stations A and B, and their respective associated mobiles a and b. That is, mobile a is communicating with base station A while mobile b is communicating with base station B. When mobiles a and b are simultaneously transmitting their respective signals, the signal from mobile a interferes with that of mobile b causing poor signal reception and hence unsuccessful decoding of mobile station b's data at base station B. In contrast, base station A may decode mobile station a's signal successfully, even in the presence of interference from mobile station b. (This can happen if the level of interference at base station A due to mobile b is low in comparison to the received signal level from mobile a.)

Once base station A decodes mobile station a's data signal, base station A may pass on the decoded data signal to base station B through backhaul links. Base station B (the base station performing cancellation) estimates the channel from mobile station a (an out-of-cell mobile), uses this channel estimate together with the decoded data signal (from mobile a) it receives from base station A to generate its estimate of the interference caused by mobile a, and then cancels this interference from its overall received signal to obtain an improved signal-to-noise ratio for mobile station b. This improvement is achieved at the cost of the additional backhaul overhead needed for base station A to exchange mobile station a's decoded data with base station B.

Figure 2:
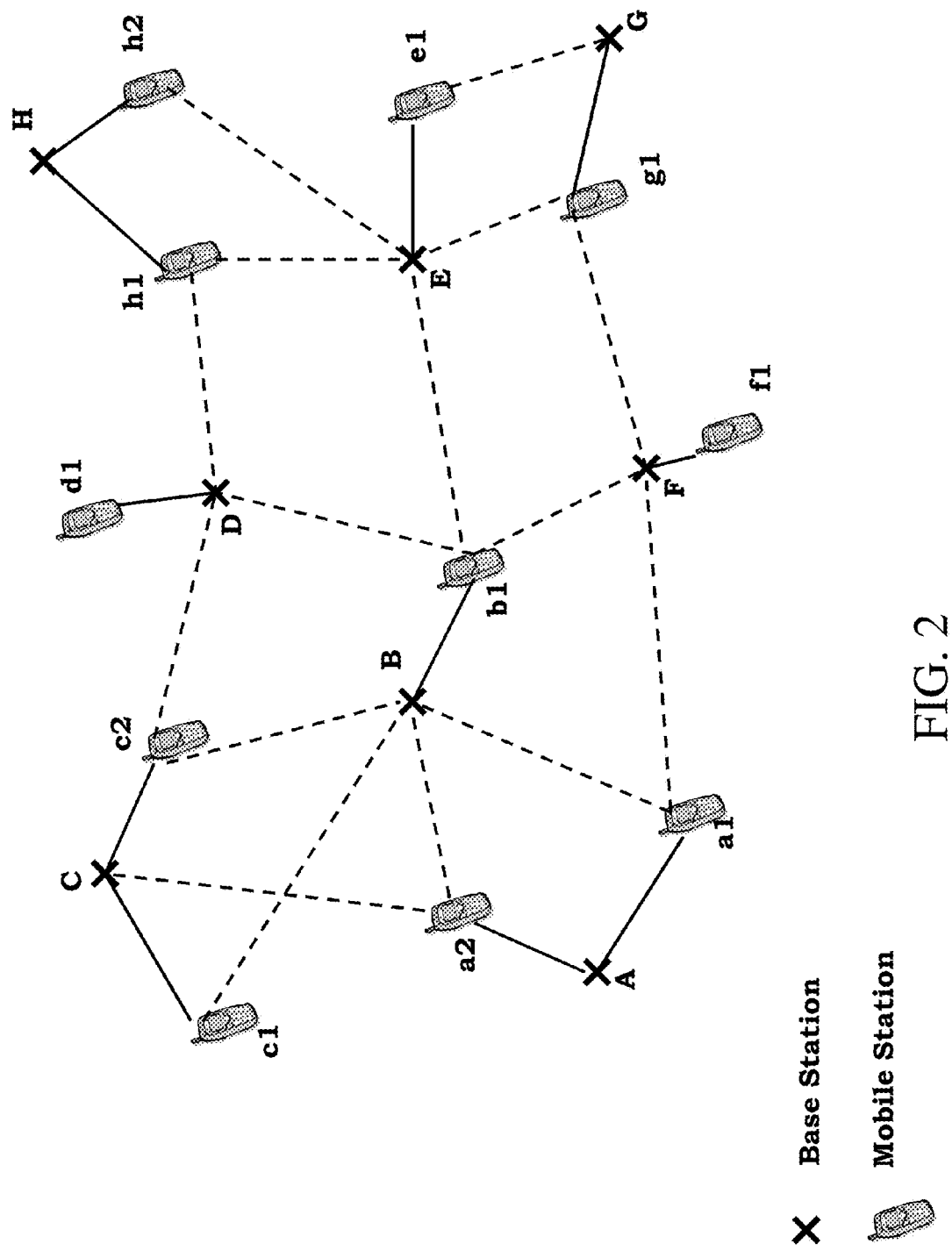
FIG. 2 illustrates an example cellular network.
Figure 7:
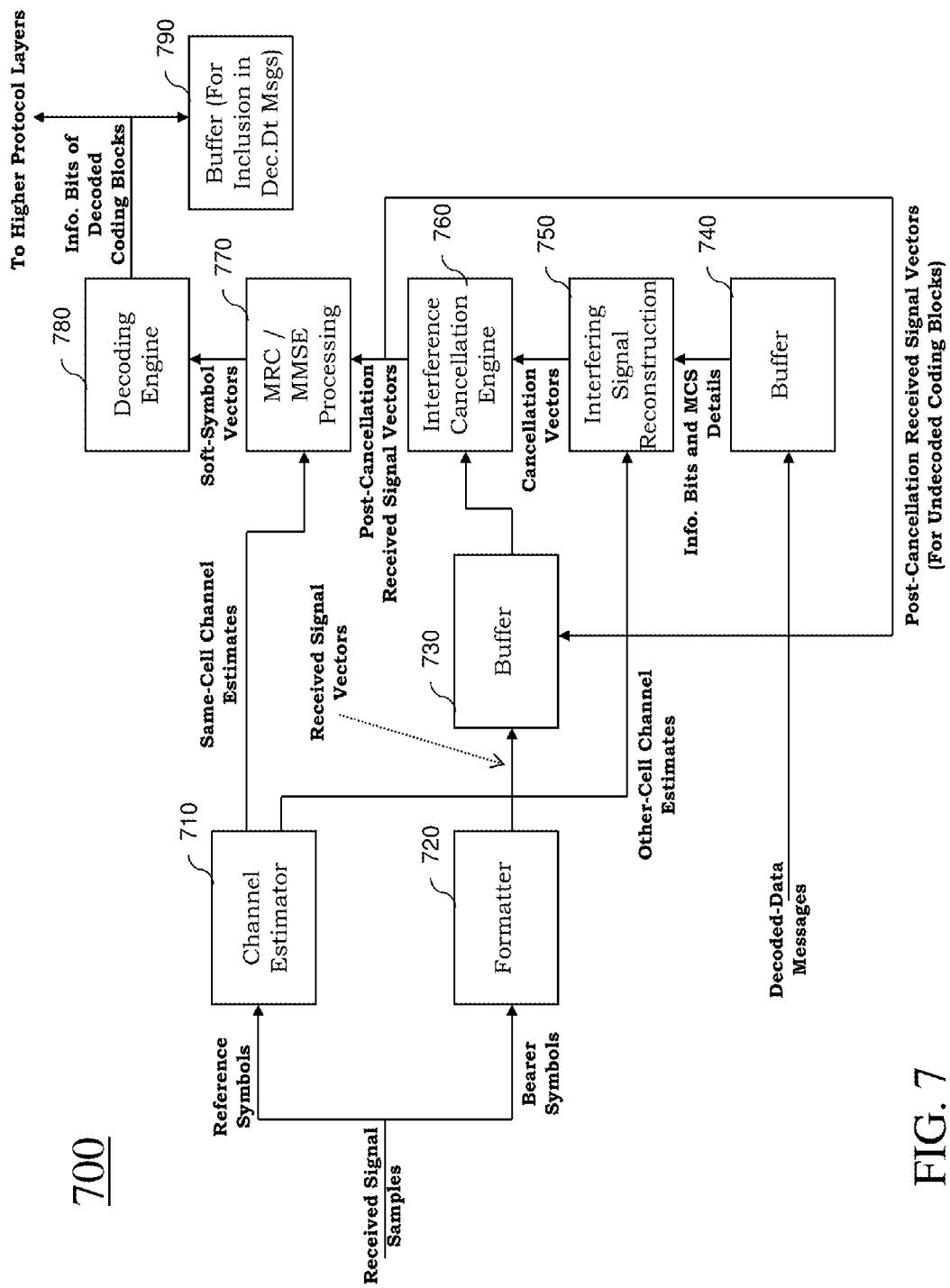
FIG. 7 is a block diagram depiction of a base station receiver in accordance with multiple embodiments of the present invention.

Consider a cellular network, such as the one illustrated in FIG. 2, comprising multiple base stations and mobile terminals. In order to more clearly explain some of the more pertinent ideas behind various embodiments, we assume base stations with omni-directional antennas. (Those familiar with the art can immediately see how the invention naturally extends to the case where base stations have sectorized antennas. Specifically, the invention can be applied to the multi-sector case by treating each antenna sector at a base station as a separate base station.) The coverage area of a base station is referred to as a cell. (When there is no possibility of confusion, we use the terms "base station" and "cell" interchangeably as there is a one-to-one correspondence between them.) Each base station is equipped with a receiver device where the uplink transmissions from all mobile stations associated with that base station are decoded. The base station associated with user j (i.e., the one whose receiver device attempts to decode its transmissions) is called the primary base station of that user, and is denoted by P(j). FIG. 7 is a block diagram depiction of a base station receiver in accordance with multiple embodiments of the present invention. Components of diagram 700 will be referred to throughout the description that follows to provide a more detailed description of various embodiments.

Looking at FIG. 2, one can see that mobile terminals a1, a2 have base station A as their primary base station; mobile terminal b1 has base station B as its primary base station; and so on. Alternatively, we say that mobile terminals a1, a2 are connected to base station A; mobile station b1 is connected to base station B; and so on. The links between terminals and their respective primary base stations are represented by solid lines whereas dashed lines represent interference links. That is, if the signal transmitted by a mobile station is received at a high enough level at a base station (other than its primary) to cause significant interference, the mobile station is shown to be connected to the base station with a dashed line.

We assume that uplink transmissions use Orthogonal Frequency Domain Multiple Access (OFDMA) or Single Carrier-Frequency Domain Multiple Access (SC-FDMA) transmission technology. These technologies typically use slotted transmissions with at least loose synchronization between transmissions emanating from different devices participating in the system. Without loss of generality, the methods and apparatuses described herein may employ alternate methods of transmission. The spectrum available for uplink transmissions is divided into multiple sub-carriers or tones.

Figure 3:
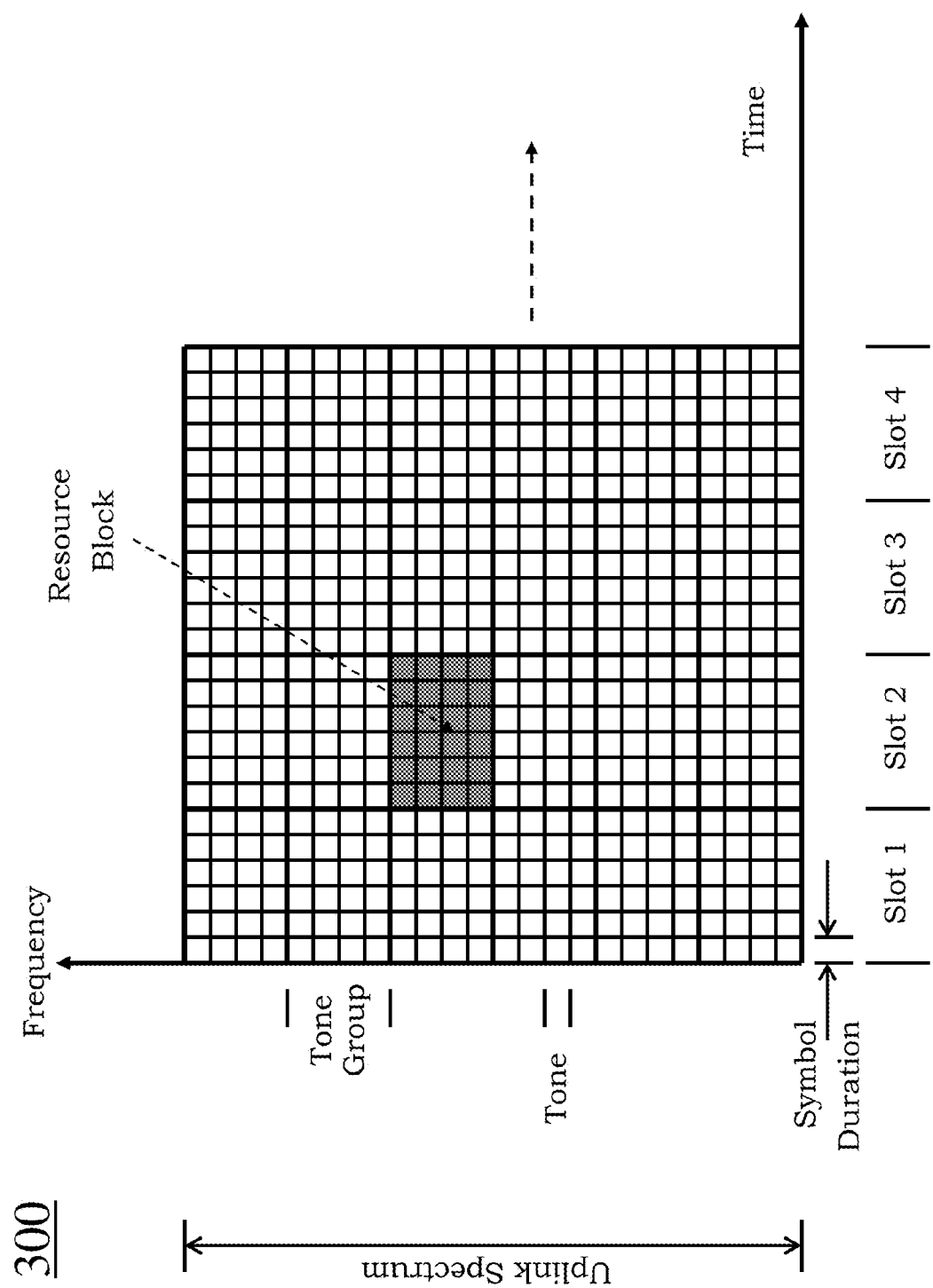
FIG. 3 is a diagram depicting the organization of transmission resources for uplink (or downlink) communications in OFDMA and SC-FDMA systems.
Figure 4:
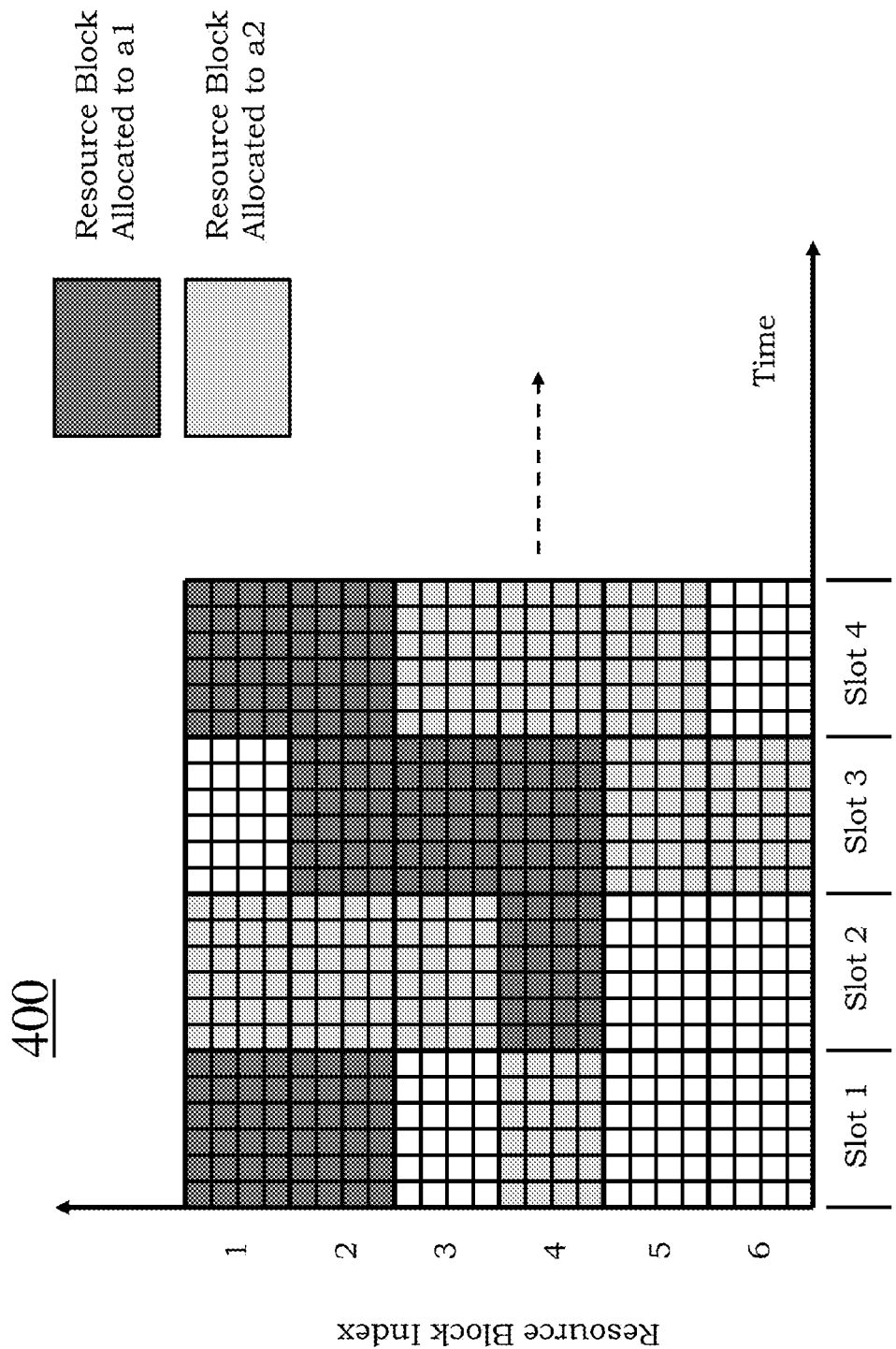
FIG. 4 is a diagram depicting example resource block allocations in accordance with various embodiments of the present invention.

FIG. 3 illustrates how transmission resources are typically organized for uplink (or downlink) communications in OFDMA and SC-FDMA systems. As shown in diagram 300, time is divided into slots (also referred to in literature as frames, sub-frames, etc.) Each slot comprises $N_S$ symbol durations. Along the frequency dimension, the available spectrum comprises $N_T$ tones or sub-carriers. The $N_T$ tones are divided into $N_R$ groups, each comprising M ($=N_T/N_R$) tones. A resource block consists of M tones belonging to a group repeated over the $N_S$ symbol durations in a slot. (Thus, a resource block comprises $M \times N_S$ modulation symbols.) The basic unit for transmission resource allocation is a resource block. It is easy to see that there are $N_R$ resource blocks associated with a slot.

When a base station schedules uplink transmissions for a slot, it selects one or more mobile stations connected to it for transmission over that slot, and then allocates one or more resource blocks (associated with that slot) to each of them. For instance, as shown in diagram 400 of FIG. 4, in slot 1, base station A has allocated resource blocks 1 and 2 to mobile station a1 and resource block 4 to mobile station a2. (Resource blocks 3, 5, and 6 have been left unused during slot 1.) In slot 2, mobile station a2 has been allocated resource blocks 1-3 and resource block 4 has been allocated to mobile station a1, and so on. Each base station prepares the schedule for uplink transmissions for a given slot sufficiently in advance and then sends the corresponding transmission grants (along with details of the modulation and coding scheme—MCS—to be used) to the concerned mobile stations over the appropriate downlink control channel. Note that in an SC-FDMA system, the tones in a resource block as well as the resource blocks allocated to the same mobile station during a slot have to be contiguous. There are no such restrictions in an OFDMA system.

Based on the transmission grants (for a given slot) received from their primary base stations, the mobile stations transmit their uplink signals as follows. Based on the MCS indicated in the transmission grant, the mobile station selects an appropriately sized chunk of information bits, and adds cyclic redundancy check (CRC) bits to it. The mobile station then encodes the information bits with CRC using the coding scheme indicated in the transmission grant, and uses the resulting coded symbols to modulate the modulation symbols in the resource blocks allocated to it. (Note that the modulation symbols in a resource block are divided into two subsets: bearer symbols and reference symbols. The reference symbols, also referred to as pilot symbols, are modulated with known signals (typically, symbols in a known sequence) and used by the base station receiver to generate channel estimates. The bearer symbols are the ones that are modulated by the coded symbols as described above.) The coded symbols may be interleaved before they are used to modulate modulation symbols. In an OFDMA system, the (possibly interleaved) coded symbols are used to directly modulate the bearer symbols in the frequency domain, whereas in an SC-FDMA system an extra processing step involving the computation of a Discrete Fourier Transform (DFT) is involved. Finally, in each symbol duration within the slot, the mobile station computes the time-domain representation of modulation symbols (modulated with coded symbols) associated with that symbol duration before transmitting the resulting signal waveform over the uplink channel.

Let us now consider the actions that take place at the various base station receivers in the cellular network over the course of a slot. During each symbol duration within a slot, the base station (i.e., the base station receiver) processes the received signal waveform by performing on it filtering, sampling and other processing operations to extract received signal samples corresponding to each modulation symbol associated with that symbol duration. These operations are repeated during each symbol period in the slot to extract received signal samples corresponding to modulation symbols transmitted in the slot. The received signal samples associated with all symbol durations within a slot are collected to form a received signal vector for the slot. Note that in the case of a base station with multiple receive antennas, a separate received signal vector is formed for each of its antennas. The operations involved in constructing a received signal vector are well known to those familiar with the art.

Before we describe the remaining actions carried out by a base station receiver in accordance with the present invention, we state what is assumed to be known to a base station receiver at this stage. Every base station, referred to by the index i, is assumed to have the following information at its disposal when it begins to process the received signal vector(s) associated with a slot:

1. Base station i is aware of the set of cells such that mobile stations from those cells often cause significant interference at Base station i's receiver. This set is referred to as the set of potentially interfering cells and is denoted by C(i). What cells should be included in the set C(i) can be determined analytically through purely geographic considerations or via measurements.

2. For each resource block associated with the slot, base station i is aware of the any information that is pertinent to estimating channels from mobile stations in cells belonging to C(i) transmitting over that resource block. For instance, in LTE, a base station may require knowledge of sounding or reference symbol sequence assignments to mobile stations in cells belonging to C(i). How base station i acquires this information depends on the method being used to assign sounding or reference symbol sequences to mobile stations in different cells. For the remainder of this document, reference symbol sequences will be assumed to provide the basis of channel estimates; however, it is well understood for an expert skilled in the art to apply the methods described herein using other information (e.g. channel sounding). The following is a partial list of possible scenarios:

a. The reference symbol sequence associated with a resource block is a static function of the cell identifier. That is, in all slots, a given cell (i.e. the base station associated with the cell) always assigns the same reference symbol sequence to resource block 1, the same reference symbol sequence (although not necessarily identical to that associated with resource block 1) to resource block 2, and so on. In such scenarios, base station i's receiver can pre-configure the reference symbol sequences being used for different resource blocks by cells in C(i).

b. Reference symbol sequences associated with different resource blocks in a slot follow a pseudo-random hopping pattern that is a function of the cell identifier. In this scenario, by locally replicating the hopping pattern being used cells in the set C(i), base station i's receiver can determine the reference symbol sequences being used by mobile stations in cells belonging to C(i) over different resource blocks in the slot.

c. The reference symbol sequences being used by mobile stations in a cell for transmission over a slot not only depend on the identifier of the cell and the slot index, they also depend on the way resource blocks in that slot are allocated by the cell to different mobile stations. (This is similar to the way reference symbol sequences are assigned in accordance with the 3GPP-LTE-Release 8 standard.) For instance, going back to FIG. 4, if the base station assigned all six resource blocks in slot 1 to the same mobile station, the latter would use one type of reference symbol sequence for the six resource blocks in that slot. On the other hand, if the first three of the five resource blocks were to be assigned to one mobile station and the remaining three to some other mobile station, the reference symbol sequences used by those two mobile stations over the same set of six resource blocks would be different from those in the first case. Since resource block assignment is typically carried out independently by different base stations, it is not possible for base station i to figure out on its own how resource blocks in a slot have been assigned to different mobile stations by cells in the set C(i). Consequently, in this scenario, we require that when a base station, say p, prepares its uplink transmission schedule (which includes resource block allocation) for a particular slot, it sends (possibly in a condensed form) a copy of its resource allocation map to all base stations that have base station p in their respective sets of potentially interfering cells. When base station i receives copies of the resource allocation maps for a given slot from all of its potentially interfering cells, it can figure out the reference symbol sequences used by mobile stations in those cells for different resource blocks in that slot.

At the end of a slot the base station receiver has constructed a received signal vector for each receive antenna of the base station. Each received signal vector has one entry for each modulation symbol in the slot; i.e. it has $N_T \times N_S$ entries since the uplink spectrum has been divided into $N_T$ tones and there are $N_S$ symbol durations within a slot.

At this stage, the base station receiver does the following: If resource block k (in the just-completed slot) has been assigned to mobile station j in its own cell, it processes the received signal samples corresponding to the reference symbols used by mobile station j and generates an estimate of the channel coefficient (see channel estimator 710, e.g.) for mobile station j over resource block k. The base station receiver generates such estimates of channel coefficients for every resource block in the just-completed slot which had been assigned to a mobile station in its own cell for uplink transmission. The example illustrated in FIG. 4 will clarify what is intended here. In this example, the entire upstream spectrum is divided into 6 resource blocks, and, during time slot 1, resource blocks 1 and 2 have been assigned to mobile station a1 in cell A and resource block 4 has been assigned to mobile station a2 in cell A. Resource blocks 3, 5 and 6 have not been assigned to any mobile station in that cell. In this case, the base station receiver associated with cell A will, at the end of slot 1, generate estimates of channel coefficients for mobile station a1 over resource blocks 1 and 2, and for mobile station a2 over resource block 4. If the base station is equipped with multiple receive antennas, such channel coefficients need to be estimated for each of the receive antennas. The estimate of channel coefficient for receive antenna q as computed by base station i for mobile station j transmitting over resource block k is denoted by $\hat{h}_{j,k,i,q}$. The channel coefficient estimate $\hat{h}_{j,k,i,q}$ can be obtained using any one of several well-known methods. One such method is as follows:

Let $r_{j,k,i,q}^{(RS)}$ denote the (column) vector of received signal samples at receive antenna q of base station i corresponding to the reference symbols transmitted by mobile station j (in cell i) over resource block k during the just-completed slot, and let $s_{j,k}$ denote the (column) vector of reference symbols that were actually transmitted by mobile station j over resource block k. The channel estimate may be obtained from the vector of received signal samples corresponding to reference symbols using several well-known methods. In one such embodiment, the desired channel coefficient estimate $\hat{h}_{j,k,i,q}$ is given by $$\hat{h}_{j,k,i,q} = s_{j,k}^\dagger \cdot r_{j,k,i,q}^{(RS)} / |s_{j,k}|^2, \qquad (1)$$

where the symbol "†" represents the conjugate-transpose of the preceding vector.

Next, the base station receiver attempts to decode all of the coding blocks transmitted by mobile stations connected to it. Thus, referring to example of FIG. 4, at the end of slot 1, the base station A attempts to decode the coding blocks transmitted by mobile station a1 over resource blocks 1 and 2, and the coding block transmitted by mobile station a2 over resource block 4. In order to avoid cumbersome descriptions, we assume that all of the bearer symbols transmitted by a mobile station over a single slot constitute a single coding block. Thus, the bearer symbols transmitted by mobile station a1 over resource blocks 1 and 2 (of slot 1) constitute a single coding block that spans two resource blocks whereas the bearer symbols transmitted by mobile station a2 over resource block 4 constitute another coding block spanning a single resource block.

In order to decode a coding block transmitted by one of the mobile stations in its cell, the base station receiver (see formatter 720 and MRC/MMSE processing unit 770, e.g.) first generates a vector of soft symbols from the corresponding received signal vector(s). The vector of soft symbols (sometimes also referred to as log-likelihood ratios) can be generated from the received signal vector(s) by processing the latter via well known techniques such as Maximal Ratio Combining (MRC), or Minimum Mean Squared Error (MMSE) processing, etc. All of these techniques use the channel coefficient estimates computed in the previous step.

The vector of soft symbols associated with a coding block along with details of the MCS used for that coding block are fed to a decoding device (see decoding engine 780, e.g.) to obtain an estimate of the information bits corresponding to the coding block. The base station receiver attempts to decode every one of the coding blocks transmitted by mobile stations connected to it. At this point, some of the coding blocks may be successfully decoded, while some may fail because of excessive noise or interference in the corresponding received signal. For a coding block, the failure to decode is indicated by the output of the decoder failing the CRC check. The information bits associated with successfully decoded coding blocks are passed on to higher protocol layers so that they can be forwarded to their ultimate destinations. At the same time, copies of these bits are kept in local buffers (see buffer 790, e.g.) so that they can be sent to neighboring base stations for interference cancellation as described later. As for the coding blocks that were not successfully decoded, the base station receiver stores the vectors of received signal samples associated with these coding blocks in local buffers (see buffer 730, e.g.). (Note that in the case of a base station with multiple receive antennas, vectors of received signal samples associated with each antenna are stored in local buffers.) The expectation is that it may be possible to refine these samples via interference cancellation if neighboring base stations are successful in decoding the signals causing interference to these samples.

Next, the base station receiver prepares a decoding state table for the just-completed slot. This table is essentially a column of integers with one entry for each resource block in the just-completed slot. The entries of this table are populated as follows: If a resource block in the just-completed slot was not used for transmission by any mobile station in the receiver's own cell, the corresponding entry is set to 0; if it fell within a coding block that was not successfully decoded, the entry corresponding to the resource block is set to 1; otherwise, i.e. if it fell in a coding block that was successfully decoded, the entry corresponding to the resource block is set to 2.

While the just-described decoding process is going on, for each resource block in the just-completed slot, the base station receiver tries to obtain estimates of channel coefficients for mobile stations belonging to its potentially interfering cells that might have been transmitting over that resource block. Recall that as stated previously, for each resource block, a base station is aware of the reference symbol sequences used by mobile stations in each of its potentially interfering cells when transmitting over that resource block. Using this information, a base station receiver, say the one associated with base station i, can obtain these estimates as follows: Let j be a mobile station in cell p that is in the set C(i), the set of potentially interfering cells from the standpoint of base station i. Let mobile station j be transmitting over resource block k in the just-completed slot. The (column) vector of received signals samples at antenna q of base station i that corresponds to the reference symbols transmitted by mobile station j over resource block k is denoted by $r_{j,k,i,q}^{(RS)}$ whereas $s_{j,k}$ denotes the (column) vector of reference symbols that were actually transmitted by mobile station j over resource block k. Note that it is easy for base station i's receiver to construct the vectors $r_{j,k,i,q}^{(RS)}$ and $s_{j,k}$ since, as stated earlier, it is aware of the reference symbol sequences used by mobile stations in cells belonging to set C(i) and how these reference symbols are transmitted. Once again, equation (1) can be used to obtain $\hat{h}_{j,k,i,q}$, an estimate of the channel coefficient for mobile station j transmitting over resource block k as seen at antenna q of base station i. Note that from the viewpoint of a base station receiver, the process of obtaining channel coefficients for mobile stations in other cells is no different from the process of obtaining channel coefficients for mobile stations in its own cell.

Next, for each resource block in the just-completed slot, the base station receiver computes an estimate of received signal strength for mobile stations in each potentially interfering cell transmitting over the resource block. Thus, for cell p, which is in the set C(i), the receiver device of base station i computes $\hat{s}_{p,k,i}$, its estimate of the received signal strength associated with the mobile in cell p that transmitted over resource block k, using the following relationship:

$$\hat{s}_{p,k,i} = \sum_{q=1}^{R} |\hat{h}_{j,k,i,q}|^2, \qquad (2)$$

where R denotes the number of receive antennas at base station i, and the indicator j stands for the identifier of the mobile station in cell p that transmitted its data over resource block k. Note that in order to obtain the estimates $\hat{h}_{j,k,i,q}$ and $\hat{s}_{p,k,i}$ as shown above, base station i need not be aware of the actual identity of the mobile station j; all it needs to know is the reference symbol sequence being used by the mobile station in cell p that transmitted its data over resource block k. The base station repeats the above process (of computing estimates of received signal strength) for each resource block (represented by index k in equation (2)) and for each cell (represented by the index p in equation (2)) in its set of potentially interfering cells.

The base station receiver (corresponding to base station i) then prepares a "Request for Decoded Data" message (also referred to simply as request message) for cells in the set C(i). Each request message contains the following fields: an originating cell (i.e. base station) identifier, a destination cell identifier, a slot-index field and a bit-map with $N_R$ entries—one entry for each resource block in the slot. The meaning of the first two fields is clear. The third field, slot-index, contains the identifier of the slot whose received signals are being processed. Thus, in accordance with the present embodiment, when the receiver device associated with base station i prepares a request message meant for cell p in the set C(i), it fills the slot-index field with the identifier of the relevant slot. Entries of the bit-map are filled as follows: For resource block k, if $\hat{s}_{p,k,i}$, the estimate of the received signal strength from a mobile station in cell p transmitting over resource block k, is above an acceptance threshold $T_1$ and if the entry corresponding to resource block k in the decoding state table associated with the just-completed slot is 1, the bit-map entry for resource block k in the request message is set to 1; otherwise, it is set to 0.

The idea here is that for any resource block, a base station should request signals for interference cancellation only if the corresponding received signal strength is not too low (as seen at the base station's receiver), and if the data associated with the resource block has not yet been decoded. The reason for imposing these conditions is the following: Clearly, if the data associated with a resource block is already decoded, there is no need for further processing the corresponding signals via interference cancellation or any other method. The reason for not asking for signals that are found to be weak at the base station's receiver is that when the received signal strength is low, the corresponding estimates of channel coefficients are likely to be rather noisy. As a result, an attempt at interference cancellation using these signals (in combination with the noisy channel estimates) is unlikely to lead to significant improvement in the signal-to-noise ratio (SNR) of the signals being decoded. By not requesting such signals from neighboring base stations, we reduce the load on the backhaul links, which is one of the objectives of various embodiments of the present invention.

In another embodiment of this invention, an additional field would indicate the maximum length of the decoded data. If the intended recipient of the message sees a 1 in the corresponding bit-map field, it would additionally compare the length of its decoded data to the value indicated in the field to determine if it should share its decoded data. The maximum length field may vary as a function of channel quality such that maximum values increase with improved channel qualities and vice versa. In this way, excessive backhaul is not wasted on links with relatively poor channel quality (and hence limited interference cancellation benefits).

The receiver device associated with base station i prepares a request message for each cell in C(i) as described above and sends it to the corresponding base station. While preparing a request message for a potentially interfering cell, if the base station finds that all entries in the bit-map contained in the message are zero, the base station does not send the message to that cell. This, too, helps reduce unnecessary traffic on the backhaul links as well as the wasting of processing capacity.

For each slot, a base station i also maintains a request table. This table contains a 2-dimensional integer array—it has one column for each cell p such that base station i is in C(p). That is, if base station (i.e., cell) i is a potentially interfering cell for cell p, then the request table maintained by cell i has a column associated with cell p. Each column of this table has $N_R$ entries, one for each resource block in the associated slot. At the end of a slot, when a base station receiver begins processing signal samples received over the slot, it creates a request table for that slot and initializes it by setting all entries in each column of the table to 0. (Note that the number of columns in this table as well as the association of columns with specific cells is static.)

The base station receiver now enters a wait state. In this wait state, it typically receives two kinds of messages: 1. Request messages from neighboring cells asking for decoded data that can be used for interference cancellation; and 2. Messages from neighboring cells carrying decoded data. We refer to the latter as decoded-data messages. (Note that the processing at different base stations does not take place in a synchronous manner. As a result, it is possible for a base station to receive a request message from another base station even before the former has finished the previously described processing and entered the wait state. The following will explain how a base station acts on receiving these messages in both cases—before entering the wait state and after entering the wait state.)

When a base station, say i, receives a request message from base station p, it knows that the latter is looking for decoded data for some of the resource blocks in the slot as indicated in the message. Specifically, if the entry corresponding to resource block k in the request message from base station p equals 1, it means that base station p is looking for decoded data for resource block k. Therefore, base station i will send the requested data to base station p if it has already decoded it and in some cases, based on the length of its decoded data. Since resource blocks do not always map to coding blocks in a one-to-one fashion, base station i responds to the request message from base station p in the following manner:

Consider the first case where base station i has not yet entered the wait state. In this case, using the bit-map contained in the request message from base station p, it updates the column of its own request table corresponding to base station p as follows: If the entry associated with a resource block in the column of the request table (corresponding to base station p) equals 2, it is left unchanged; otherwise it is set equal to the corresponding entry in the bit-map. After updating entries in the appropriate column of the request table, base station i continues with the processing it was engaged in before being interrupted by the arrival of the request message.

In the second case, i.e. where the request message from base station p arrives at base station i while the latter is in the wait state, base station i updates the entries of the appropriate column of the request table in the just-described manner, and then prepares a decoded-data message to be sent to base station p. We describe how base station i constructs this message using an illustrative example. To that end, consider the example shown in FIG. 5.

In the example shown in FIG. 5, each slot contains 6 resource blocks. In the slot of interest, mobile stations connected to base station i had transmitted two coding blocks—one spanning resource blocks 1 and 2 and the other spanning resource blocks 4, 5 and 6. Resource block 3 was not used by any mobile station connected base station i. Over the same slot, mobile stations connected to base station p had also transmitted two coding blocks—one spanning resource blocks 2 and 3, and the other spanning resource blocks 5 and 6. Assume now that at the end of the first round of decoding at the conclusion of the slot of interest, base station i was successful in decoding the coding block spanning resource blocks 1 and 2 whereas the decoding of the other coding block failed. Also assume that base station p failed to successfully decode any of its coding blocks.

Diagram 510 indicates the state of the decoding state table of base station i after the first round of decoding. Clearly, since only the coding block spanning resource blocks 1 and 2 was successfully decoded at that stage, the entries corresponding to resource blocks 1 and 2 equal 2. The entries corresponding to resource blocks 4, 5 and 6 equal 1 because the corresponding coding block was not successfully decoded. The entry corresponding to resource block 3 equals 0 because that block was not used by any mobile station in cell i for transmission over the corresponding slot.

Diagram 520 shows the bit-map included in the request message received by base station i from base station p. Since base station p was unable to decode any coding block transmitted over the relevant slot, the entries corresponding to all resource blocks used by mobiles connected to base station p to transmit their data equal 1. The only entries that are 0 are the ones corresponding to unused resource blocks (in cell p).

Diagram 530 shows the column of base station i's request table corresponding to base station p immediately after base station i has received the request message from base station p. It can be seen that this diagram is identical to 520 because, since no coding blocks have been sent to base station p so far, base station i has merely copied the bit-map included in the request message received from base station p into the appropriate column of its request table before proceeding further.

Base station i, then, identifies all the coding blocks to be included in the decoded data message to be sent to base station p. In order to be included in the decoded data message, a coding block needs to meet three criteria: 1) It must include at least one resource block requested by base station p; 2) It must have been successfully decoded by base station i; and 3) It cannot have been previously delivered to base station p. Base station i uses the following procedure to identify such coding blocks: It compares its decoding state table (510) with the column of its request table corresponding to base station p (530), looking for resource block indices such that entries corresponding to them equal "2" in the decoding state table (510) and "1" in the appropriate column of the request table (530). In the example being considered, the only resource block that meets this requirement corresponds to resource block index 2. Since base station i is aware of the fact that this resource block was part of the coding block that spanned resource block indices 1 and 2, it decides to include that coding block in the decoded data message to be sent to base station p.

Thus, base station i prepares a decoded data message, including in it the information bits associated with the coding block that spanned resource blocks 1 and 2, wherein the information bits may be compressed to minimize the amount of data transmitted on backhaul links. It also includes the relevant details of the coding block (e.g., details of the MCS used) as well as its own identifier and the identifier of base station p in the appropriate fields of the message, and sends this message to base station p over the appropriate interface. After sending the message to base station p, base station i updates the entries in the column of the request table (540) corresponding to base station p as follows: For each coding block included in the just-sent decoded data message, set the entries corresponding to each resource block included in the coding block to 2; leave the rest of the entries unchanged.

The above procedure is followed to generate a decoded data message whenever a request message is received by a base station i in the "Wait" state. Also, after completing each round of decoding, base station i checks the status of all columns of its request table and the updated state of its decoding state table to see if it can send additional decoded data to one or more of the base stations that have unfulfilled or partially-fulfilled requests for decoded data. (This is done in order to respond to request messages that were received while the base station receiver was busy decoding its own coding blocks.) Once again, the procedure described above is followed to identify which, if any, coding blocks need to be sent to these base stations.

The other type of message that a base station may receive in the wait state is a decoded-data message from a base station to which it had, at some point in time in the past, sent a request message. When a base station, say base station i, receives a decoded-data message from another base station (say, p), it saves the message in a local buffer (see buffer 740, e.g.), referred to as decoded-data buffer, and goes back to the wait state. Note that in the embodiment of the invention being described here, by staying in the wait state for some time base station i attempts to collect decoded data associated with a number of potential interferers before attempting interference cancellation and decoding. This approach saves the number of decoding attempts a base station receiver makes before meeting with success.

In alternative embodiments, base station i may order the potential interferers from the strongest to the weakest based on their respective channel estimates and send request messages to the corresponding base stations one at a time in that order. After each such transmission of a request message, base station i may wait a certain amount of time to receive the corresponding decoded data. If the decoded data is received during that time, base station i immediately attempts interference cancellation (using the just received decoded data), followed by a decoding attempt. Base station i sends a request message to the base station corresponding to the next highest interferer only if the decoding attempt is unsuccessful or if base station i did not receive the decoded data before the end of the waiting period. These embodiments attempt to reduce the backhaul load at the expense of a few additional decoding attempts.

When base station i comes out of the wait state (such as on the expiry of a timer, referred to as a decoding timer), it begins a round of interference cancellation, followed by an attempt at decoding all of the coding blocks that were left in an undecoded state at the end of the previous round of decoding.

Let us consider how a base station (say, i) performs a round of interference cancellation followed by decoding. Base station i maintains a "cancellation table" for each slot. This cancellation table has as many rows as there are resource blocks in a slot and as many columns as there are potentially interfering cells from the viewpoint of cell i (i.e., one for each cell in the set C(i)). The cancellation table associated with a slot is initialized (by setting all entries to 0) at the end of the slot when the first round of decoding for the slot begins. If an entry in this table equals 1, it means that the corresponding resource block has been used for interference cancellation. (Conversely, if an entry equals 0, it means that the corresponding resource block is yet to be used for interference cancellation.) Because a coding block is used as a unit for decoding and coding blocks transmitted by mobile stations in different cells do not always line up exactly, base station i performs interference cancellation as described below.

Recall that the base station receiver had stored the received signal samples for all coding blocks that were not successfully decoded at the end of the previous round of decoding. Using the decoded data (from other base stations) received since the end of the previous round of decoding (and stored in the decoded data buffer), the base station receiver attempts to cancel interference from each of these undecoded coding blocks. The following example illustrates how this interference cancellation is carried out.

Figure 6:
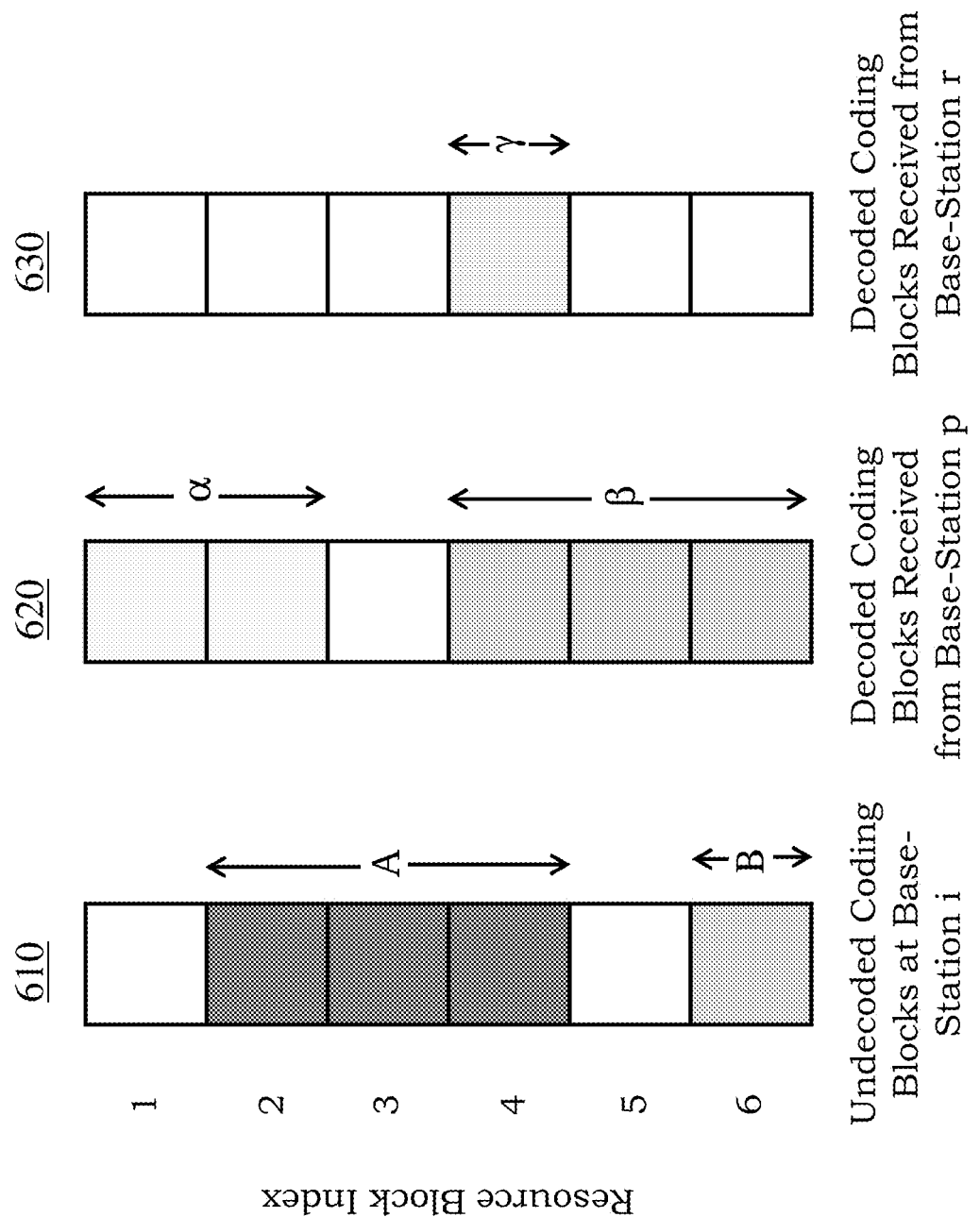
FIG. 6 illustrates the use of interference cancellation in accordance with various embodiments of the present invention.

Consider the example illustrated by FIG. 6. As shown in table 610, base station i has two undecoded coding blocks at the beginning of this (new) round of interference cancellation and decoding—one spanning resource block 2, 3, and 4, and the other spanning a single resource block, 6. It also has three coding blocks in its decoded data buffer—two received from base station p and one from base station r as shown in tables 620 and 630. Before proceeding further, base station i looks up its cancellation table to check whether any of the coding blocks in the decoded data buffer have already been used for interference cancellation. If a coding block is found to have already been used for interference cancellation (indicated by the presence of "1" in the corresponding entries in the cancellation table), that block is discarded from the decoded data table. Let us assume that the two blocks from base station p and one from base station r have not yet been used for interference cancellation; thus all three of them are eligible for the same.

Interference cancellation is performed separately on each undecoded coding block (of base station i). To show how it is done, consider the coding block spanning resource blocks 2, 3, and 4. Let us refer to this coding block as A. As one can see in FIG. 6, all three coding blocks in the decoded data buffer (labeled $\alpha$, $\beta$ and $\gamma$) have at least a partial overlap with coding block A. Thus all three of them will be involved in interference cancellation on coding block A. In order to perform interference cancellation on coding block A, we begin with the vector of received signal samples associated with that coding block. This vector, referred to as r(A), spans three resource blocks, namely, 2, 3, and 4. (Recall that this vector was stored by the base station receiver since the coding block A had failed the decoding process during the previous round.) Next, we attempt to cancel the interference caused by coding blocks $\alpha$, $\beta$ and $\gamma$ from the vector r(A). Now, to cancel the interference due to a coding block, one constructs an estimate of the received signal (see interfering signal reconstructor 750) that can be attributed to that coding block. Thus, for instance, to cancel the effect of coding block α, base station i does the following: Using the details of the MCS used in the transmission of coding block α (which was included in the decoded-data message in which the information bits associated with coding block α were sent to base station i), it reconstructs the vector of coded symbols (possibly interleaved and/or processed via system-specific operations such as DFT in the case of an SC-FDMA system) associated with the coding block α. Next, for each resource block within the coding block α, the base station uses the corresponding estimate of channel coefficient (calculated earlier) to construct an estimate of the received signal values that can be attributed to coding block α. The following explains how the base station receiver constructs an estimate of received signal values that can be attributed to coding block α:

Let $x^{(\alpha)}$ denote the vector of coded symbols associated with coding block α. Clearly, $x^{(\alpha)}$ spans resource blocks 1 and 2. Let $x^{(\alpha)}(1)$ and $x^{(\alpha)}(2)$ denote the restrictions of $x^{(\alpha)}$ to resource blocks 1 and 2, respectively. (That is, $x^{(\alpha)}(1)$ is the part of $x^{(\alpha)}$ that spans resource block 1 and $x^{(\alpha)}(2)$ is the part that spans resource block 2.) Let $\hat{h}^{(\alpha)}(1)$ and $\hat{h}^{(\alpha)}(2)$ respectively denote the estimates of channel coefficients corresponding to resource blocks 1 and 2 for the channel between the mobile station that transmitted coding block α and base station i. Then, the vector of estimates of received signal values that can be attributed to coding block α can be written as $$\tilde{r}^{(\alpha)}=[\hat{h}^{(\alpha)}(1)x^{(\alpha)}(1)|\hat{h}^{(\alpha)}(2)x^{(\alpha)}(2)], \quad (3)$$

where the symbol "|" denotes the concatenation of the two vectors "$\hat{h}^{(\alpha)}(1) x^{(\alpha)}(1)$" and "$\hat{h}^{(\alpha)}(2) x^{(\alpha)}(2)$." Now, only the second part of the vector $\tilde{r}^{(\alpha)}$, namely $\hat{h}^{(\alpha)}(2) x^{(\alpha)}(2)$, overlaps with the coding block A. Moreover, coding block A extends over resource blocks 2, 3 and 4, the latter two of which are free of any interference from coding block α. As a consequence, by adding all-zero vectors of suitable lengths to the part of $\tilde{r}^{(\alpha)}$ that overlaps with coding block A, the base station receiver constructs a cancellation vector $v^{(\alpha)}$, given by $$v^{(\alpha)}=[\hat{h}^{(\alpha)}(2)x^{(\alpha)}(2)|0|0], \quad (4)$$

where "0" represents an all-zero vector of suitable length. (In this case the two all-zero vectors in eq. (4) extend over resource blocks 3 and 4 respectively.) Note that the cancellation vector $v^{(\alpha)}$ extends over resource blocks 2, 3 and 4 exactly as the coding block A does. Since the estimate of channel coefficient, $\hat{h}^{(\alpha)}(2)$, is not perfect (because of the presence of noise and interference), one may use a suitable de-emphasis factor $\eta^{(\alpha)}(2)$ to suppress the effect of noise and interference. In general, the de-emphasis factor is a monotonic function of the Signal-to-Interference+Noise-Ratio (SINR) associated with the channel estimate, approaching the limit of 1 for large SINR values. If a de-emphasis factor is used, the cancellation vector takes the form:

$$v^{(\alpha)}=[\eta^{(\alpha)}(2)\hat{h}^{(\alpha)}(2)x^{(\alpha)}(2)|0|0]. \quad (5)$$

In a similar manner, the base station receiver computes cancellation vectors $v^{(\beta)}$ and $v^{(\gamma)}$, respectively associated with the other two coding blocks (β and γ) that overlap with coding block A.

The base station receiver then cancels the interference (see interference cancellation engine 760, e.g.) caused by coding blocks α, β and γ from r(A), the vector of received samples associated with coding block A:

$$r(A)\leftarrow r(A)-(v^{(\alpha)}+v^{(\beta)}+v^{(\gamma)}). \quad (6)$$

We refer to the above vector as post-cancellation vector of received signal samples associated with coding block A. (Note that in case the base station has multiple receive antennas, it obtains such post-cancellation vectors of received signal samples for each of the receive antennas.)

Next, the base station receiver processes the post-cancellation vector of received signals (see MRC/MMSE processing unit 770, e.g.) via any one of the many well-known techniques (e.g. MMSE, MRC, etc.) to obtain a vector of soft symbols associated with the coding block A. The vector of soft symbols, along with details of the MCS used for that coding block, is then fed to the decoding device (see decoding engine 780, e.g.) to obtain an estimate of the information bits corresponding to coding block A. These two steps—obtaining the vector of soft symbols and decoding it—are identical to the corresponding steps performed by the receiver in the previous round of decoding. The only difference is that in the previous round of decoding the receiver had used the original vector of received signal samples associated with the coding block whereas in the current round of decoding the post-cancellation vector of received signal samples is used. Since the latter has an improved SINR (because of the cancellation of at least a part of the interfering signals), it is more likely to be successfully decoded.

Once again, when the receiver attempts decoding coding block A, there are two possible outcomes: 1) The decoding is successful, and 2) The decoding fails. If the base station receiver succeeds in decoding the coding block, it passes the information bits associated with the coding block to the higher protocol layers for forwarding them to the destination, saves a copy (see buffer 790, e.g.) of these bits (and details of the associated MCS) for including them in decoded-data messages that may have to be sent to other base stations, and updates the entries in the decoding-state table corresponding to the resource blocks associated with the coding block. (The last step involves setting these entries to 2.) If, on the other hand, the decoding fails, the receiver merely stores (see buffer 730, e.g.) the post-cancellation vector(s) of received signal samples associated with the coding block in place of the original vector(s) of received signal samples. (The post-cancellation vector(s) replaces the previously stored vector(s) of received signal samples in the local buffers.)

The above steps (of interference cancellation, decoding and post-decoding processing) are repeated for every coding block that was not successfully decoded in the previous round of decoding. At the end of the current round of decoding, for each of the potentially interfering cells, the base station receiver prepares a new request message exactly as before except that in this new message the bit-map entry corresponding to a resource block is 1 only if that resource block belongs to a coding block that has not been successfully decoded even after the current round of decoding. The rest of the bit-map entries are all equal to 0. The base station receiver sends these request messages to the corresponding base stations and enters the wait state. Note that the request messages sent after this round of decoding inform the base stations associated with potentially interfering cells of coding blocks that were successfully decoded in this round. This helps them avoid sending decoded data that is no longer needed (for interference cancellation).

Once again, as described earlier, the base station receiver receives decoded-data messages and request messages during the wait state. (It can receive these messages even while it is busy decoding its own coding blocks.) It responds to these messages as described earlier. At the end of the wait state, it attempts a new round of decoding on those coding blocks that were not successfully decoded during the previous round of decoding. This whole cycle is repeated a few times until either all coding blocks are successfully decoded or the number of cycles reaches a previously determined upper limit. At this point, the receiver clears all data, tables, buffers, etc., associated with the slot and informs the higher layers of coding blocks that could not be successfully decoded, thus ending all the physical layer processing associated with the slot being considered.

While the above description suggests various strategies for limiting the backhaul exchange of decoded data, additional reductions may be needed depending on the actual backhaul bandwidth available in a particular network. The following seven techniques may be employed individually or in various combinations to further reduce the backhaul bandwidth consumed by interference cancellation:

1) Enforce a maximum average payload, that is, averaged across physical resource blocks (PRBs). For example, a user is scheduled in a given subframe (duration 1 ms) and its payload will span one or more PRBs. The average payload per PRB metric is intended to allow the following two cases to be distinguished: a user with 100 bits spanning one PRB vs. a user with 100 bits spanning 5 PRBs. The former requires a similar backhaul exchange but only allows for cancellation over a single PRB. If the decoded data for an identified strongest N interferer exceeds this maximum average payload threshold, its decoded data is not exchanged.
2) Enforce a maximum overall payload. This would be for the entire payload of a given user on a given subframe. This approach is not expected to work as well as #1 above, but it is an alternative. If the decoded data for an identified strongest N interferer exceeds this maximum overall payload threshold, its decoded data is not exchanged.
3) Enforce a maximum MCS for the interferer. If the interferer's MCS exceeds the specified maximum, its decoded data shall not be exchanged.
4) Enforce a maximum modulation scheme for the interferer. If the interferer's modulation scheme exceeds the specified maximum, its decoded data shall not be exchanged.
5) Enforce a maximum error control coding rate for the interferer. If the interferer's coding rate exceeds the specified maximum, its decoded data shall not be exchanged.
6) Enforce a maximum delta path loss for the interferer, where delta path loss is quantified as the difference in path loss between 1) the interferer and the sector for the served user and 2) the interferer and its served sector.
7) Enforce a maximum received power difference for the interferer, where the power difference is quantified as the difference in received power between 1) the interferer and its serving sector and 2) the interferer and the sector for the served user.
8) For each of the above techniques, a different threshold might be employed depending on the degree of overlap between the interferer and served user. For instance, if the interferer and served user only overlap on one PRB (yet the interferer spans many more PRBs), then the cost of sending all the interferer decoded bits (spanning all its PRBs) may be quite costly. (Note that all of the decoded bits for the interferer's transmission in this subframe ought to be sent so that the interferer's signal can be reconstructed and cancelled).

Any one or more of these techniques may be implemented by either the network equipment requesting the decoded data or the equipment providing the decoded data. The thresholds described above may be set and then tuned by the network operator as a way of controlling the level of backhaul data exchange in the operator's particular network.

The detailed and, at times, very specific description above is provided to effectively enable a person of skill in the art to make, use, and best practice the present invention in view of what is already known in the art. In the examples, embodiments of the present invention are described in the context of specific architectures, specific system configurations and specific wireless signaling technologies for the purpose of illustrating possible implementations and a best mode for the present invention. Thus, the examples described should not be interpreted as restricting or limiting the scope of the broader inventive concepts.

Figure 8:
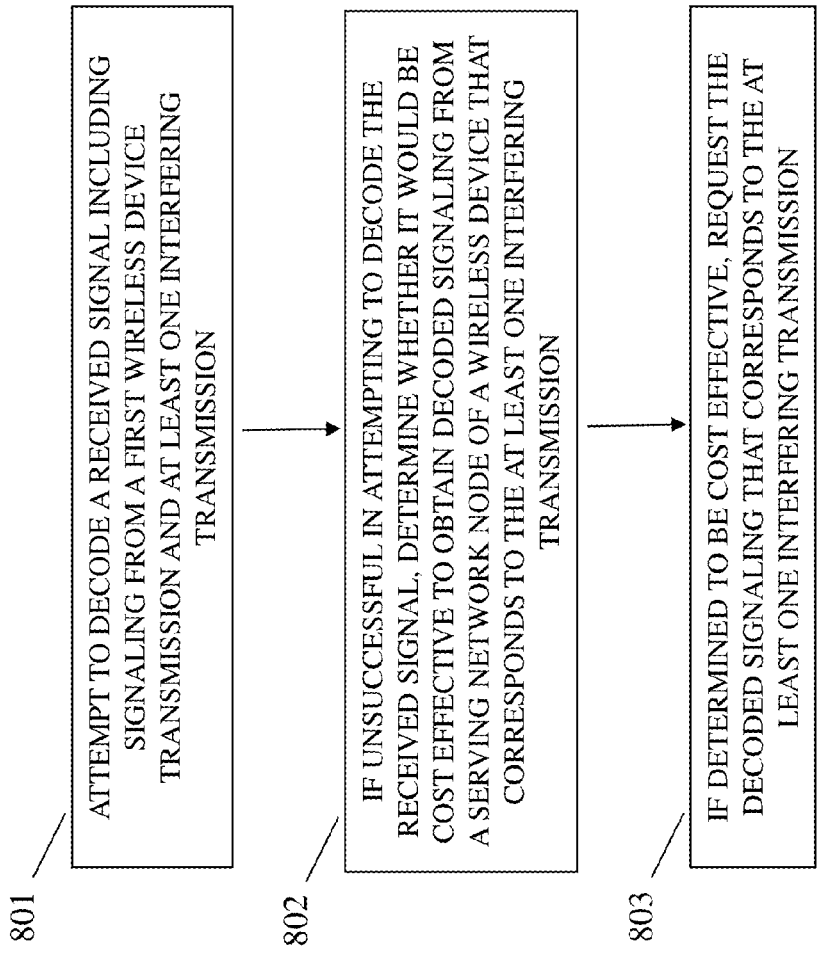
FIG. 8 is a logic flow diagram of functionality performed in accordance with various embodiments of the present invention.
Figure 9:
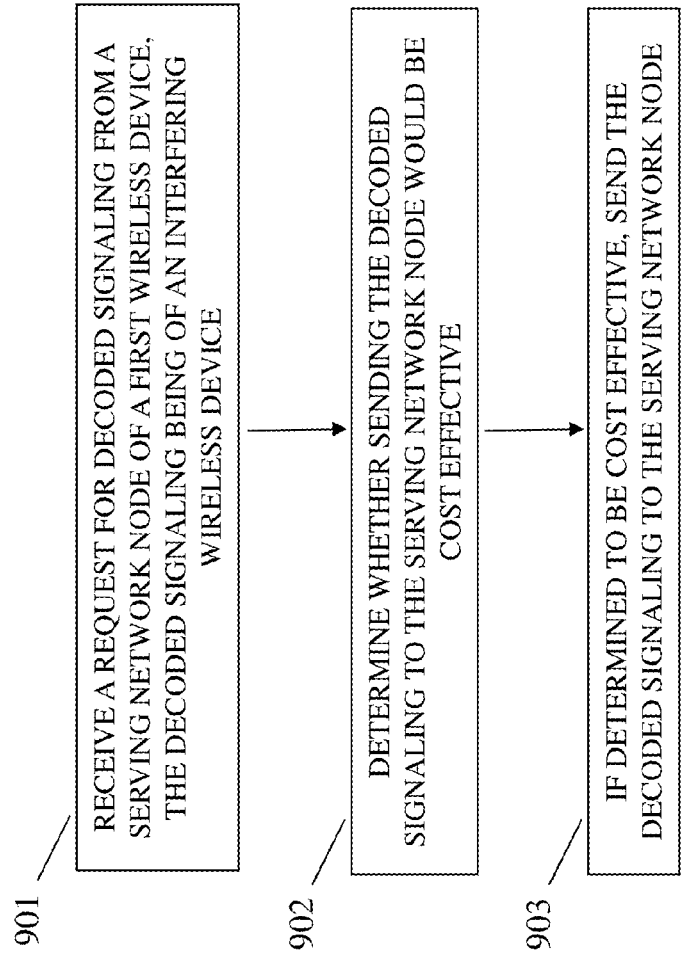
FIG. 9 is a logic flow diagram of functionality performed in accordance with various embodiments of the present invention.
Figure 10:
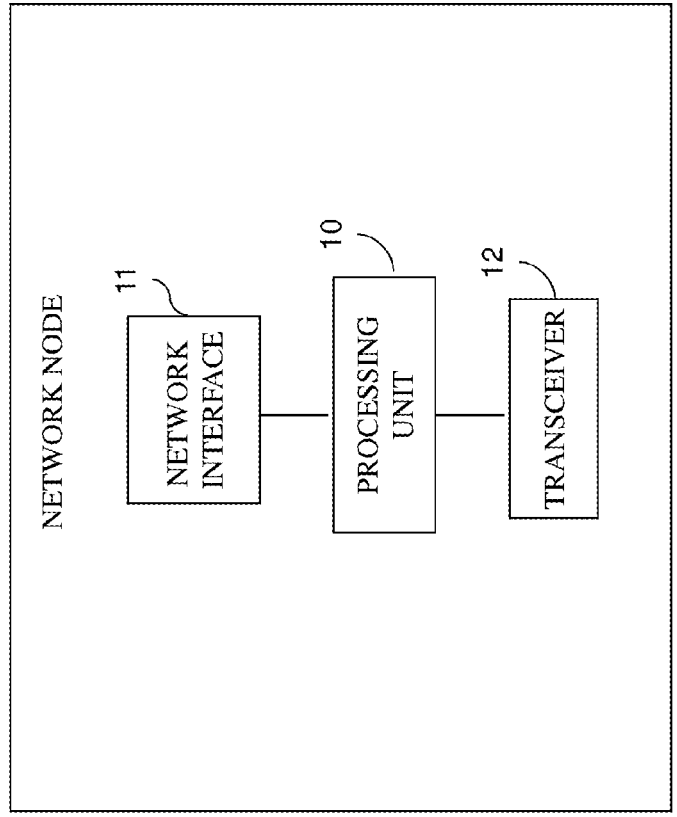
FIG. 10 is a block diagram depiction of a network node in accordance with various embodiments of the present invention.

Having described certain embodiments in detail above, a review of the more general aspects common to many of the embodiments of the present invention can be understood with reference to FIGS. 8-10. FIG. 8 is a logic flow diagram of functionality performed in accordance with various embodiments of the present invention. Diagram 800 serves as a good generalization of many of the embodiments described in detail above. Thus, it is referenced now to provide a recap of the general approach to network interference cancellation followed by many embodiments of the present invention. In diagram 800, a first network node attempts (801) to decode a received signal which includes signaling from a first wireless device transmission and at least one interfering transmission. If the first network node is unsuccessful in attempting to decode the received signal, it is determined (802) whether it would be cost effective to obtain decoded signaling from a serving network node of a wireless device that corresponds to the at least one interfering transmission. If (803) it is determined to be cost effective, the decoded signaling that corresponds to the at least one interfering transmission is requested.

FIG. 9 is a logic flow diagram of functionality performed in accordance with various embodiments of the present invention. Diagram 900 serves as a good generalization of many of the embodiments described in detail above. Thus, it is referenced now to provide a recap of the general approach to network interference cancellation followed by many embodiments of the present invention. In diagram 900, a request for decoded signaling is received (901) from a serving network node of a first wireless device, the decoded signaling being of an interfering wireless device. It is determined (902) whether sending the decoded signaling to the serving network node would be cost effective. If (903) it is determined to be cost effective, the decoded signaling is sent to the serving network node.

FIG. 10 is a block diagram depiction of a network node 1000 in accordance with various embodiments of the present invention. Network node 1000 includes processing unit 10, network interface 11 and wireless transceiver 12.

Those skilled in the art will recognize that the depiction of network node 1000 in FIG. 10 does not show all of the components necessary to operate in a commercial communications system but only those components and logical entities particularly relevant to the description of embodiments herein. For example, network nodes are known to comprise processing units, network interfaces, and wireless transceivers. In general, such components are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, network node 1000, for example, represents known devices that have been adapted, in accordance with the description herein, to implement multiple embodiments of the present invention. Furthermore, those skilled in the art will recognize that aspects of the present invention may be implemented in and/or across various physical components and none are necessarily limited to single platform implementations.

In the example of FIG. 10, network node 1000 is depicted in accordance with various embodiments of the present invention. Depending on the embodiment, network node 1000 may implement either or both of the methods depicted by diagrams 800 and 900. For example, network node 1000 may request decoded signaling from another network node and also receive requests for different decoded signaling from other network nodes.

Thus, depending on the embodiment, processing unit 10 is configured to attempt to decode a received signal, the received signal comprising signaling received via wireless transceiver 12 from a first wireless device transmission and at least one interfering transmission. Processing unit 10 is further configured to determine, if unsuccessful in attempting to decode the received signal, whether it would be cost effective to obtain decoded signaling from a serving network node (not shown) of a wireless device (not shown) that corresponds to the at least one interfering transmission. Processing unit 10 is further configured to request, if determined to be cost effective, the decoded signaling that corresponds to the at least one interfering transmission. Depending on the embodiment, this request may be made via network interface 11.

Processing unit 10 may be configured to determine whether it would be cost effective to obtain decoded signaling in many different ways. For example, in some embodiments, if the size of the decoded signaling exceeds a maximum decoded data threshold, obtaining the decoded signaling is determined to not be cost effective. In some embodiments, if the size of the decoded signaling divided by the number of resource blocks spanned by the decoded signaling exceeds a maximum average data threshold, obtaining the decoded signaling is determined to not be cost effective. In some embodiments, if the modulation scheme associated with the decoded signaling is greater than a maximum modulation rate threshold, obtaining the decoded signaling is determined to not be cost effective. In some embodiments, if the rate of the error control coding associated with the decoded signaling is greater than a maximum rate, obtaining the decoded signaling is determined to not be cost effective. In some embodiments, if the modulation and coding scheme (MCS) associated with the decoded signaling is greater than a maximum MCS rate threshold, obtaining the decoded signaling is determined to not be cost effective.

In some embodiments, if a delta path loss associated with the wireless device is greater than a maximum delta path loss threshold, obtaining the decoded signaling is determined to not be cost effective. Here, the delta path loss associated with the wireless device is a difference in path loss between the serving network node of the wireless device and network node 1000. In some embodiments, if a received power difference associated with the wireless device is greater than a maximum received power difference threshold, obtaining the decoded signaling is determined to not be cost effective. Here, the received power difference associated with the wireless device is a difference in received power between the serving network node of the wireless device and the network node 1000. In some embodiments, it is determined whether obtaining the decoded signaling would be cost effective based at least in part upon the number of overlapping resource blocks between the first wireless device transmission and the decoded signaling.

As mentioned previously, depending on the embodiment, network node 1000 may implement either or both of the methods depicted by diagrams 800 and 900. Thus, network node 1000 may request decoded signaling from another network node, in accordance with an embodiment described above, and additionally receive requests for different decoded signaling from other network nodes, in accordance with an embodiment described below. Alternatively, network node 1000 may implement only one or more embodiments described below.

Thus, depending on the embodiment, processing unit 10 is configured to receive via network interface 11 a request for decoded signaling from a serving network node of a first wireless device, the decoded signaling being of an interfering wireless device. Processing unit 10 is further configured to determine whether sending the decoded signaling to the serving network node would be cost effective and, if cost effective, to send the decoded signaling to the serving network node via the network interface 11.

Processing unit 10 may be configured to determine whether it would be cost effective to send decoded signaling in many different ways. For example, in some embodiments, if the size of the decoded signaling exceeds a maximum decoded data threshold, sending the decoded signaling is determined to not be cost effective. In some embodiments, if the size of the decoded signaling divided by the number of resource blocks spanned by the decoded signaling exceeds a maximum average data threshold, sending the decoded signaling is determined to not be cost effective. In some embodiments, if the modulation scheme associated with the decoded signaling is greater than a maximum modulation rate threshold, sending the decoded signaling is determined to not be cost effective. In some embodiments, if the rate of the error control coding associated with the decoded signaling is greater than a maximum rate, sending the decoded signaling is determined to not be cost effective. In some embodiments, if the modulation and coding scheme (MCS) associated with the decoded signaling is greater than a maximum MCS rate threshold, sending the decoded signaling is determined to not be cost effective.

In some embodiments, if a delta path loss associated with the interfering wireless device is greater than a maximum delta path loss threshold, sending the decoded signaling is determined to not be cost effective. Here, the delta path loss associated with the interfering wireless device is a difference in path loss between the serving network node of the first wireless device and a serving network node (e.g., network node 1000) of the interfering wireless device. In some embodiments, if a received power difference associated with the interfering wireless device is greater than a maximum received power difference threshold, sending the decoded signaling is determined to not be cost effective. Here, the received power difference associated with the interfering wireless device is a difference in received power between a serving network node (e.g., network node 1000) of the interfering wireless device and the serving network node of the first wireless device. In some embodiments, it is determined whether sending the decoded signaling would be cost effective based at least in part upon the number of overlapping resource blocks between a transmission of the first wireless device and the decoded signaling.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method, comprising:
decoding a received signal at a first network node, the received signal including signaling from a first wireless device transmission and at least one interfering transmission;
if the decoding of the received signal is unsuccessful, determining whether to request decoded signaling from a serving network node of a wireless device that corresponds to the at least one interfering transmission by determining cost effectiveness of obtaining the decoded signaling based on a size of the decoded signaling, a number of resource blocks spanned by the decoded signaling, and whether an error control coding scheme of the decoded signal is greater than a maximum rate threshold; and
requesting the decoded signaling, upon determining that the obtaining the decoded signaling from the serving network node is cost effective,
wherein if the error control coding scheme is greater than the maximum rate threshold, the determining whether to request the decoded signaling determines not to request the decoded signaling.

2. The method as recited in claim 1, wherein
the determining determines that the obtaining the decoded signaling is not cost effective if at least of,
   the size of the decoded signaling exceeds a maximum decoded data threshold,
   the size of the decoded signaling divided by the number of resource blocks spanned by the decoded signaling exceeds a maximum average data threshold,
   a modulation scheme associated with the decoded signaling is greater than a maximum modulation rate threshold,
   a Modulation and Coding Scheme (MCS) associated with the decoded signaling is greater than a maximum MCS rate threshold,
   a delta path loss associated with the wireless device is greater than a maximum delta path loss threshold, the delta path loss associated with the wireless device is a difference in path loss between the first network node and the serving network node of the wireless device, and
   a received power difference associated with the wireless device is greater than a maximum received power difference threshold, the received power difference associated with the wireless device is a difference in the received power between the serving network node of the wireless device and the first network node; or
the determining whether to request the decoded signaling includes determining whether the obtaining the decoded signaling is cost effective based at least in part upon a number of overlapping resource blocks between the first wireless device transmission and the decoded signaling.

3. A network node comprising:
a network interface configured to communicate with other network devices;
a wireless transceiver; and
a processor configured to communicate with the network interface and the wireless transceiver, the processor being further configured to,
   decode a received signal, the received signal including, signaling received via the wireless transceiver from a first wireless device transmission, and at least one interfering transmission, determine, if the decoding of the received signal is unsuccessful, whether to request decoded signaling from a serving network node of a wireless device that corresponds to the at least one interfering transmission by determining cost effectiveness of obtaining the decoded signaling based on a size of the decoded signaling, a number of resource blocks spanned by the decoded signaling, and whether an error control coding scheme of the decoded signal is greater than a maximum rate threshold; and request the decoded signaling upon determining that the obtaining the decoded signaling from the serving network node is cost effective, wherein the processor is configured to determine not to request the decoded signaling, if the error control coding scheme is greater than the maximum rate threshold.

4. The network node as recited in claim 3, wherein the processor is configured to determine that the obtaining the decoded signaling is not cost effective, if the size of the decoded signaling divided by the number of resource blocks spanned by the decoded signaling exceeds a maximum average data threshold.

5. The network node as recited in claim 3, wherein the processor is configured to determine that the obtaining the decoded signaling is not cost effective, if a modulation scheme associated with the decoded signaling is greater than a maximum modulation rate threshold.

6. The network node as recited in claim 3, wherein the processor is configured to determine that the obtaining the decoded signaling is not cost effective, if a Modulation and Coding Scheme (MCS) associated with the decoded signaling is greater than a maximum MCS rate threshold.

7. The network node as recited in claim 3, wherein the processor is configured to determine that the obtaining the decoded signaling is not cost effective, if a delta path loss associated with the wireless device is greater than a maximum delta path loss threshold, wherein the delta path loss associated with the wireless device is a difference in path loss between the network node and the serving network node of the wireless device.

8. The network node as recited in claim 3, wherein the processor is configured to determine that the obtaining the decoded signaling is not cost effective, if a received power difference associated with the wireless device is greater than a maximum received power difference threshold, the received power difference associated with the wireless device is a difference in the received power between the serving network node of the wireless device and the network node.

9. The network node as recited in claim 3, wherein the processor is configured to determine whether the obtaining the decoded signaling is cost effective based at least in part upon a number of overlapping resource blocks between the first wireless device transmission and the decoded signaling.

10. A method, comprising:
receiving a request for decoded signaling from a serving network node of a first wireless device, the decoded signaling being of an interfering wireless device;
determining whether to send the decoded signaling to the serving network node by determining cost effectiveness of sending the decoded signaling based on a size of the decoded signaling, a number of resource blocks spanned by the decoded signaling, and whether an error control coding scheme associated with the decoded signaling is greater than a maximum rate threshold; and if determined to be cost effective, sending the decoded signaling to the serving network node, wherein, if the error control coding scheme associated with the decoded signaling is greater than the maximum rate threshold, the determining whether to send the decoded signaling determines not to send the decoded signaling.

11. The method as recited in claim 10, wherein
the determining determines that the sending the decoded signaling is not cost effective, if at least one of
the size of the decoded signaling exceeds a maximum decoded data threshold,
the size of the decoded signaling divided by the number of resource blocks spanned by the decoded signaling exceeds a maximum average data threshold,
a modulation scheme associated with the decoded signaling is greater than a maximum modulation rate threshold,
a Modulation and Coding Scheme (MCS) associated with the decoded signaling is greater than a maximum MCS rate threshold,
a delta path loss associated with the interfering wireless device is greater than a maximum delta path loss threshold, the delta path loss associated with the interfering wireless device is a difference in path loss between the serving network node of the first wireless device and a serving network node of the interfering wireless device,
received power difference associated with the interfering wireless device is greater than a maximum received power difference threshold, the received power difference associated with the interfering wireless device is a difference in received power between a serving network node of the interfering wireless device and the serving network node of the first wireless device, or
the determining the cost effectiveness of sending the decoded signaling includes determining whether sending the decoded signaling is cost effective based at least in part upon a number of overlapping resource blocks between a transmission of the first wireless device and the decoded signaling.

12. A network node comprising:
a network interface configured to communicate with other network devices;
a wireless transceiver; and
a processor configured to communicate with the network interface and the wireless transceiver, the processor being further configured to,
receive via the network interface a request for decoded signaling from a serving network node of a first wireless device, the decoded signaling being of an interfering wireless device,
determine whether to send the decoded signaling to the serving network node by determining cost effectiveness of sending the decoded signaling based on a size of the decoded signaling, a number of resource blocks spanned by the decoded signaling, and whether an error control coding scheme associated with the decoded signaling is greater than a maximum rate threshold, and
send, if determined to be cost effective, the decoded signaling to the serving network node via the network interface,
wherein the processor is configured to determine not to send the decoded signaling, if the error control coding scheme associated with the decoded signaling is greater than the maximum rate threshold.

13. The network node as recited in claim 12, wherein the processor is configured to determine that sending the decoded signaling is not cost effective, if the size of the decoded signaling divided by the number of resource blocks spanned by the decoded signaling exceeds a maximum average data threshold.

14. The network node as recited in claim 12, wherein the processor is configured to determine that sending the decoded signaling is not cost effective, if a modulation scheme associated with the decoded signaling is greater than a maximum modulation rate threshold.

15. The network node as recited in claim 12, wherein the processor is configured to determine that sending the decoded signaling is not cost effective, if a Modulation and Coding Scheme (MCS) associated with the decoded signaling is greater than a maximum MCS rate threshold.

16. The network node as recited in claim 12, wherein the processor is configured to determine that sending the decoded signaling is not cost effective, if a delta path loss associated with the interfering wireless device is greater than a maximum delta path loss threshold, the delta path loss associated with the interfering wireless device is a difference in path loss between the serving network node of the first wireless device and a serving network node of the interfering wireless device.

17. The network node as recited in claim 12, wherein the processor is configured to determine that sending the decoded signaling is not cost effective, if a received power difference associated with the interfering wireless device is greater than a maximum received power difference threshold, the received power difference associated with the interfering wireless device is a difference in received power between a serving network node of the interfering wireless device and the serving network node of the first wireless device.

18. The network node as recited in claim 12, wherein the processor is configured to determine whether sending the decoded signaling is cost effective based at least in part upon a number of overlapping resource blocks between a transmission of the first wireless device and the decoded signaling.

\* \* \* \* \*